UNITED STATES PATENT OFFICE.

BERTHOLD WUTH, BERTRAM MAYER, CARL JAGERSPACHER, AND EUGEN ANDERWERT, OF BASEL, SWITZERLAND, ASSIGNORS TO SOCIETY OF CHEMICAL INDUSTRY IN BASLE, OF BASEL, SWITZERLAND.

COPPER COMPOUNDS OF ORTHOOXYAZO DYESTUFFS AND A PROCESS OF MAKING SAME.

1,216,760.  Specification of Letters Patent.  Patented Feb. 20, 1917.

No Drawing.  Application filed August 3, 1915.  Serial No. 43,413.

*To all whom it may concern:*

Be it known that we, Dr. BERTHOLD WUTH, chemist, a subject of the King of Great Britain, Dr. BERTRAM MAYER, chemist, a subject of the King of Bavaria, Dr. CARL JAGERSPACHER, chemist, a citizen of the Swiss Republic, and EUGEN ANDERWERT, chemist, a citizen of the Swiss Republic, all four residents of Basel, Switzerland, have invented new Copper Compounds of Orthooxyazo Dyestuffs and a Process of Making Same, of which the following is a full, clear, and exact specification.

We have found that the orthooxyazo dyestuffs sensible to copper can be transformed in well defined copper compounds soluble in water, from which the copper cannot be precipitated with sodium carbonate, soda lye and ammonia. As these compounds are furthermore fast to acids, they suit to dye animal fibers (wool, silk, etc), straw, woodbast, etc., in an acid bath. The dyeings produced with these copper products possess a perfect insensibility to copper, a good fastness to washing and particularly an extraordinary fastness to light, without further subsequent treatment.

The preparation of the new copper compounds is effected by acting on a watery solution or suspension of the orthooxyazo dyestuffs (either in form of their color acids or in form of the salts of these latter) with copper compounds as for instance copper salts, copper oxid or copper hydroxid. Hereby generally a change of color occurs. By a tipping test with potassium ferrocyanid it can be discerned if the reaction is complete. So far as the copper compounds formed are not directly precipitated from the reaction mass, they can be separated by adding common salt.

Example 1: To a solution of 20 parts of the monoazo dyestuff derived from orthoamidophenolparasulfonic acid and from 2:5:7-amidonaphtholsulfonic acid in 1000 parts of water is added at 90 to 100° C. the solution of 10 parts copper sulfate. The coloration of the yellow-red solution turns to violet-red. On cooling the copper compound of the color acid crystallizes in small bright brass-yellow crystals. The compound is separated by filtration, washed with a little water and dried. It constitutes a brown powder with a metallic luster, dissolving in water with a violet-red coloration which does not change on addition of soda lye. From this solution it dyes animal fibers, straw, woodbast, etc., red-violet tints fast to washing and to light. On the other hand the sodium salt of the monoazo dyestuff employed as parent material dissolves in water with a brownish yellow coloration turning to red-violet on addition of soda lye; it dyes from an acid bath brown tints of a lower degree of fastness to washing and to light. The new copper compound contains 13.31% of copper; 1 Cu in 1 molecule

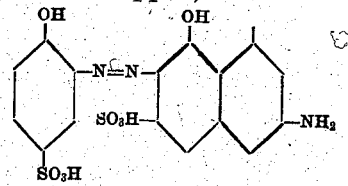

would correspond to 12.67% Cu.

Example 2: A solution of 20 parts of the monoazo dyestuff derived from orthoamidophenolparasulfonic acid and betanaphthol in 2000 parts of boiling water is mixed with a solution of 15 parts crystallized copper sulfate. The coloration of the red solution turns to dark-cherry-red and the copper compound precipitates from the hot solution in the form of bright brown needles. It is separated by filtration, washed with a little water and dried. The so obtained brown powder dissolves in water with a violet-red coloration which does not change on addition of soda lye. From its aqueous solutions it dyes wool, silk, etc., Bordeaux-red tints of a very good fastness to light and to washing. The monoazo dyestuff employed as parent material or its sodium salt dissolves in water with an orange-red coloration turning to violet-red on addition of soda lye and it dyes in an acid bath red-brown tints of a lower degree of fastness to light and washing.

Example 3: To a solution of 20 parts of the monoazo dyestuff derived from sulfoamidosalicylic acid and phenylmethylpyrazolone in 500 parts of boiling water is added a solution of 12 parts copper sulfate. The orange coloration of the solution turns to brown and on cooling the copper compound separates as orange-brown small needles. After filtering, washing and drying it constitutes an orange powder, dissolving in water with a brown-yellow coloration which does not change on addition of soda lye.

From its aqueous solutions it dyes animal fibers, straw, wood-bast, etc., yellow-orange tints of excellent fastness to washing and to light. On the other hand, the monoazo dyestuff employed as parent material or its sodium salt dissolves in water with an orange-yellow coloration turning to clear-yellow on addition of soda-lye and dyes a pure orange of bad fastness to light and washing. The new compound contains 11.91% copper; 1 Cu in 1 molecule

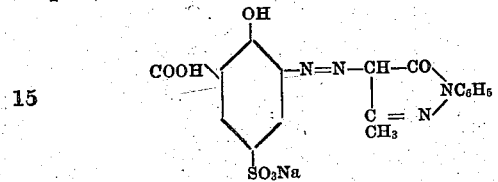

would correspond to 12.56 per cent. of Cu. The following tabular exhibit relates to several copper compounds obtainable according to the new process.

| Copper compound of the dyestuff resulting from the diazo derivative— | | Dyeing from acid bath on wool, silk, straw, etc. |
|---|---|---|
| Of— | And— | |
| OH—C6H4—NH2 | Acid chromotrope | Violet. |
| OH—C6H3(Cl)—NH2 | Acid chromotrope | Blue-violet. |
| | Acetyl-H-acid | Reddish-violet |
| | 2:5-Aminonaphthol-7-sulfonic acid | Red-violet. |
| | 2-Phenylamino-5-naphthol-7-sulfonic acid | Red-violet. |
| | Benzoyl-2:5-5 aminonaphthol-7-sulfonic acid | Lilac. |
| OH—C6H3(NO2)—NH2 | 2:5-Aminonaphthol-7-sulfonic acid (alk. or acid comb.) | Bordeaux. |
| | 2-Phenylamino-5-naphthol-7-sulfonic acid | Violet Bordeaux. |
| | Benzoyl-2:5-aminonaphthol-7-sulfonic acid | Bordeaux. |
| | 2:8-Aminonaphthol-6-sulfonic acid (alkal. comb) | Brown-violet. |
| | 2:8-Aminonaphthol-6-sulfonic acid (acid comb.) | Brown. |
| | Acid chromotrope | Violet. |
| | Acetyl-H-acid | Dull-violet. |
| | 1:8-Aminonaphthol-3:6-disulfonic acid H. | Dark-violet-blue. |
| | 1:8-Aminonaphthol-2:4-disulfonic acid | Reddish-blue. |
| | 1:8-Aminonaphthol-4-monosulfonic acid | Green-blue. |
| | 1:5-Naphtholsulfonic acid | Bordeaux. |
| OH—C6H3(NO)—NH2 | 2:4-Diamino-diphenylamin-3'-monosulfonic acid | Brown. |
| | p-Sulfophenylmethylpyrazolone | Brownish-orange. |
| OH—C6H3(SO3H)—NH2 | Betanaphthol | Blue-red. |
| | 2:5-Aminonaphthol-7-sulfonic acid | Deep-Bordeaux. |
| | 1-Phenyl-3-methyl-5-pyrazolone | Brownish-yellow-orange. |
| | 1:5-Sulfonaphtyl-3-methyl 5-pyrazolone | Corinth. |
| OH—C6H2(NO2)(CH3)—NH2 | 1:5-Naphtholsulfonic | Red-violet. |
| | Dioxynaphthalenesulfonic acid R. | Dark-violet. |
| | 1:8-Aminonaphthol-2:4-disulfonic acid | Blue. |
| | 1:8-Aminonaphthol-3:6-disulfonic acid H. | Gray-blue. |
| | Acetyl-H-acid | Violet. |
| OH—C6H2(NO2)(Cl)—NH2 | 1:4-Naphtholsulfonic acid | Prune. |
| | 1:5-Naphtholsulfonic acid | Blue-violet. |
| | 1:8-Amidonaphthol-2:4-disulfonic acid | Blue. |
| OH—C6H2(HOOC)(SO3H)—NH2 | Meta-phenylendiamin | Chestnut. |
| | 1:4-Naphtholsulfonic acid | Blue-red. |
| | 2:6-Naphtholsulfonic acid | Red. |
| OH—C6H2(HOOC)(NO2)—NH2 | 1:4-Naphtholsulfonic | Bordeaux. |
| | 1:8-Aminonaphthol-3:6-disulfonic acid | Dark-blue. |
| | Resorcin | Brown. |
| OH—C6H2(NO2)(SO3H)—NH2 | Betanaphthol | Bordeaux. |
| | 2:3-Oxynaphtholic-acid | Red-violet. |
| OH—C6H2(NO2)2—NH2 | 1:5-Naphtholsulfonic acid | Prune. |
| | 2:6-Naphtholsulfonic acid | Corinth. |
| | 1:3:6-Naphtholdisulfonic acid | Violet-Bordeaux. |
| | 1:8-Aminonaphthol-4-monosulfonic acid | Green. |
| | 1:8-Aminonaphthol-3:6-disulfonic acid | Black. |
| | 1:8-Aminonaphthol-2:4-disulfonic acid | Green-blue. |
| | 2:5-Aminonaphthol-7-sulfonic acid | Brown-violet. |
| | 2-Phenylamino-5-naphthol-7-sulfonic acid | Dark-violet. |

| Copper compound of the dyestuff resulting from the diazo derivative— | | Dyeing from acid bath on wool, silk, straw, etc. |
|---|---|---|
| Of— | And— | |
| 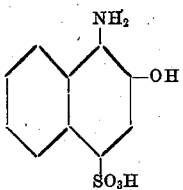 | Alpha-naphthol. Beta-naphthol. 1-Phenyl-3-methyl-5-pyrazolone. | Pure-violet. Violet. Blue-red. |
| 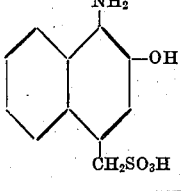 | Alpha-naphthol. Beta-naphthol. 1-Phenyl-3-methyl-5-pyrazolone. | Pure-violet. Violet. Blue-red. |
| 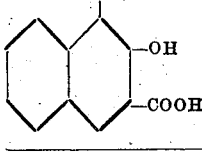 | Alpha-naphthol. 1-Phenyl-3-methyl-5-pyrazolone. | Deep blue-violet. Blue-red. |

The new copper compounds can also be transformed into lac-dyes.

What we claim is:

1. The herein described process for the manufacture of new copper compounds of orthooxyazo dyestuffs, soluble in water, consisting in acting with a copper compound on orthooxyazo dyestuffs sensible to copper in the presence of a solvent.

2. As new products the described new copper compounds of orthooxyazo dyestuffs, which are soluble in water, from which the copper cannot be precipitated with sodium carbonate, soda lye and ammonia and which constitute powders of metallic luster dissolving in water to clear deep colored solutions, which do not change on addition of soda lye or of sodium carbonate and from which animal fibers as wool, silk and leather, further straw and wood-bast are dyed, according to the methods used for acid dyestuffs, various tints showing without any further treatment a very good fastness to washing and to light.

In witness whereof we have hereunto signed our names this 15th day of July, 1915, in the presence of two subscribing witnesses.

DR. BERTHOLD WUTH.
DR. BERTRAM MAYER.
DR. CARL JAGERSPACHER.
EUGEN ANDERWERT.

Witnesses:
ARNOLD ZUBER,
AMAND RITTER.